(12) United States Patent
George (10) Patent No.: US 9,272,846 B2
(45) Date of Patent: Mar. 1, 2016

(54) CONVEYOR CHUTE FOR THE INTERIOR OF A BUILDING AND METHOD OF PALLETIZING SAME FOR SHIPMENT

(71) Applicant: Charlton L. George, Summerland Key, FL (US)

(72) Inventor: Charlton L. George, Summerland Key, FL (US)

( * ) Notice: Subject to any disclaimer, the term of this patent is extended or adjusted under 35 U.S.C. 154(b) by 0 days.

(21) Appl. No.: 14/537,739

(22) Filed: Nov. 10, 2014

(65) Prior Publication Data

US 2015/0063975 A1 Mar. 5, 2015

Related U.S. Application Data

(63) Continuation-in-part of application No. 13/302,013, filed on Nov. 22, 2011, now abandoned.

(51) Int. Cl.
| | |
|---|---|
| *B65G 57/20* | (2006.01) |
| *B65G 11/14* | (2006.01) |
| *B65G 11/02* | (2006.01) |
| *B65G 11/18* | (2006.01) |
| *B65G 57/16* | (2006.01) |
| *D06F 95/00* | (2006.01) |
| *E04F 17/12* | (2006.01) |

(52) U.S. Cl.
CPC ............ *B65G 11/143* (2013.01); *B65G 11/023* (2013.01); *B65G 11/026* (2013.01); *B65G 11/183* (2013.01); *B65G 11/186* (2013.01); *B65G 57/16* (2013.01); *B65G 57/20* (2013.01); *D06F 95/00* (2013.01); *E04F 17/12* (2013.01)

(58) Field of Classification Search
CPC .. B65G 11/143; B65G 11/023; B65G 11/183; B65G 57/16; B65G 11/186; B65G 11/026; B65G 57/24; B65G 57/20; E04F 17/12
See application file for complete search history.

(56) References Cited

U.S. PATENT DOCUMENTS

| | | | | |
|---|---|---|---|---|
| 892,550 | A * | 7/1908 | Ream ................... | B65G 11/023 138/120 |
| 1,152,309 | A * | 8/1915 | Farley ..................... | E04F 17/12 193/34 |
| 1,503,669 | A * | 8/1924 | Simon ............................. | 193/30 |
| 1,510,288 | A * | 9/1924 | Malone .......................... | 193/34 |
| 1,886,793 | A * | 11/1932 | Davidson ............. | B65G 11/183 193/34 |
| 1,898,343 | A * | 2/1933 | Davidson ...................... | 248/208 |
| 2,707,042 | A * | 4/1955 | Weiler ................. | B65G 11/023 193/32 |
| 2,720,302 | A * | 10/1955 | Madden ........................ | 193/2 R |
| 3,627,090 | A * | 12/1971 | Dickey ............................ | 193/34 |
| 4,640,403 | A * | 2/1987 | McDermott ............ | E04F 17/12 193/34 |
| 5,031,829 | A | 7/1991 | Shantzis | |
| 5,090,546 | A | 2/1992 | McDermott | |
| 5,127,507 | A * | 7/1992 | McDermott ............ | E04F 17/12 193/17 |
| 5,253,766 | A * | 10/1993 | Sims ......................... | B07C 7/00 193/2 A |
| 5,289,909 | A | 3/1994 | Maxwell et al. | |

(Continued)

*Primary Examiner* — Gene Crawford
*Assistant Examiner* — Thomas Randazzo
(74) *Attorney, Agent, or Firm* — GrayRobinson, PA; Donald S. Showalter (57) ABSTRACT

A chute apparatus for conveying objects by gravity from at least one higher floor to at least one lower floor of internally a building includes one or more sets of discrete sections having passages which form an elongated conduit which may pass through one or more floors inside the building. The passage of one section of each set section decreases in transverse cross section in a given longitudinal direction and a passage of one of the other sections increases in transverse cross-section by a substantially corresponding amount. Two sections of each set couple telescopingly to permit their longitudinal span to be selected and/or adjusted in the field.

15 Claims, 9 Drawing Sheets

(56) References Cited

U.S. PATENT DOCUMENTS

| | | |
|---|---|---|
| 5,568,871 A | 10/1996 | Shantzis |
| 5,941,362 A | 8/1999 | Preston |
| 6,062,368 A | 5/2000 | Kamm |
| 6,439,383 B1 | 8/2002 | Janousek |
| 6,737,974 B2 | 5/2004 | Dickinson |
| 7,472,779 B2 * | 1/2009 | Boustani et al. ............... 193/2 A |
| 7,581,629 B2 | 9/2009 | Kohler |
| 7,836,665 B2 * | 11/2010 | Weder .................... B65B 11/045 53/399 |
| 2004/0035050 A1 * | 2/2004 | McLarty .................. A47G 7/08 47/72 |
| 2009/0133985 A1 * | 5/2009 | Preston ................. B65F 1/0093 193/34 |

* cited by examiner

CONVEYOR CHUTE FOR THE INTERIOR OF A BUILDING AND METHOD OF PALLETIZING SAME FOR SHIPMENT

CROSS-REFERENCE TO RELATED APPLICATION

This application is a continuation-in-part of co-pending application U.S. patent application Ser. No. 13/302,013 filed Nov. 22, 2011 priority to which is hereby claimed under 35 U.S.C. §120.

STATEMENT REGARDING FEDERALLY SPONSORED-RESEARCH OR DEVELOPMENT

Not Applicable.

INCORPORATION BY REFERENCE

U.S. patent application Ser. No. 13/302,013 filed Nov. 22, 2011 is expressly incorporated herein by reference in its entirety to form part of the present disclosure.

FIELD OF THE INVENTION

The invention relates to the field of conveyor chutes of the type installed inside a multi-story building for conveying trash, recyclables, laundry items, or other objects under gravity from one or more higher floors of the building to a lower floor of the building and to a method of palletizing such conveyor chutes for shipment.

BACKGROUND OF THE INVENTION

Conveyor chutes are typically installed in multi-story buildings such as hotels, hospitals, high-rise condominiums and the like for conveying trash, recyclables or linen items from one or more upper floors to a lower floor within the interior of the building. Unlike what are commonly referred to as "debris chutes", which are structures which are mounted along the outside of a building temporarily for use during construction, demolition or renovation to conduct construction debris downwardly along a path which is located predominantly or entirely on the exterior of a building, conveyor chutes of the type to which the present invention relates are permanent fixtures and are located substantially entirely inside of a building to provide a conduit having a substantially vertically oriented central bore through which objects may conveniently be transported by gravity from one or more upper floors of a building to a basement, or other lower floor, of the building. Such conveyor chutes sometimes discharge into a sorting device or a bin disposed adjacent a terminal end of the conveyor chute. Such conveyer chutes are sometimes installed inside fire-rated shafts, especially where local codes may so require, and are sometimes installed next to elevators. Access doors are typically provided on the chute at each upper floor to allow objects to be loaded into the chute for transport while preventing such objects from being ejected from the conveyor chute when the door is closed. In some cases, such access doors may be associated with a control panel which enables users to designate the nature of an object being loaded so the object can be sorted appropriately by a sorting device.

For example, U.S. Pat. No. 5,568,871 to Shantzis discloses a system in which a sorting device is disposed beneath a single chute. The sorting device has a turntable which carries a plurality of large receptacles, one for each category of waste, such as glass, aluminum, paper or garbage. A control on each floor enables a user to operate the turntable remotely to position the appropriate receptacle beneath the chute to receive a selected category of waste. The chute itself generally has a plurality of discrete sections which are joinable to one another to form the substantially continuous elongated bore through which the objects fall. As depicted in Shantzis '871, these sections are typically generally cylindrically-shaped with reduced diameter end portions which allow the lower end of one section to be inserted into the top end of an adjacent section to form overlapping joints which shed any liquid which flows downward along the inside wall of the bore from the inside of one section to the inside of the next without leaking to the exterior. The access door is generally connected to an intake section which has a generally cylindrical body from which a protuberance extends radially. The protuberance terminates in a portal which is ultimately fitted with a frame for the access door.

According to the prior art, each intake section is typically about six feet (6 ft.) in overall length and has a cylindrical body whose inside diameter is equal to the nominal inside diameter of the chute except for a relatively short portion at its bottom end which is slightly necked-down so as to permit formation of a lap joint with the top end of the next-lower section. A lower portion of each intake section passes through a hole in the floor which is surrounded by an acoustically isolated floor mounting frame which is bolted to the floor slab. A plurality of substantially Z-shaped clips, which are welded to the intake section about one-third of its total length up from its open bottom end engage the floor mounting frame to support each intake section such that approximately four feet of the intake section projects above floor level while approximately two feet of the intake section is suspended below floor level. An approximately four foot long tube of the same nominal inside diameter as the intake section has a lower end which is provided with a male connector in the form of a circumferential bead below which is a reduced diameter portion which has been crimped to form corrugations. This reduced diameter portion is of a sufficiently small outside diameter to fit inside the top end of an adjoining section. The approximately four foot long tube is joined to a shorter tube of same nominal inside diameter as the intake section and the approximately four foot long tube itself. This joint is facilitated by another male connector, of the same construction as just described, which is provided on the lower end of the shorter tube, permitting the lower end of the shorter tube to fit inside the top end of the approximately four foot long tube and form a lap joint therewith. The shorter tube is of a length which depends on the distance between adjacent floor slabs in a particular building. This length is selected such that the necked-down portion of the intake section mounted in the floor above fits inside, and forms a lap joint with, the top portion of the shorter tube.

Despite their segmental construction, one of the major shortcomings of prior art conveyor chutes has been that they make very inefficient use of shipping resources even when shipped disassembled as they are when shipped from a manufacturer to a distributor or from a distributor to a job site. Because the chute sections are hollow and are dimensioned to form an open bore which has substantially constant diameter throughout the entire length of the chute, they tend to occupy excessive volume per unit weight when packed for shipping. As a consequence, shipping costs tend to be high because the usable volume of a truck or shipping container is typically substantially fully occupied well before applicable weight limits are approached.

SUMMARY OF THE INVENTION

In view of the foregoing, it is an object of the invention to provide a conveyor chute whose packing density for shipment is significantly improved over the prior art.

It is a further object of the invention to provide a method for efficiently palletizing a conveyor chute of the improved design.

It is a further object of the invention to provide a conveyor chute comprising one or more sets of sections and in which at the longitudinal span represented by at least two of the sections of each set can be selected and/or adjusted in the field in the course of installing the chute in a given building as may be desired to accommodate variations in the vertical slab-to-slab spacing between adjacent floors and/or to permit relaxed longitudinal dimensional tolerances and/or accommodate deviations from nominal longitudinal dimensions any of the sections themselves.

In some embodiments, a conveyor chute apparatus for conveying objects by gravity internally of a building from at least one higher floor to at least one lower floor of a building may include one or more sets of discrete sections which, in use, are coupled to one another form an elongated hollow conduit having an open bore through which the objects may fall. The apparatus may also include at least one mount for supporting at least one of said sections of each set in an opening in each floor of the building through which the conduit passes. A chute apparatus for conveying objects by gravity from at least one higher floor to at least one lower floor of internally a building includes one or more sets of discrete sections having passages which form an elongated conduit which may pass through one or more floors inside the building. In some embodiments, the passage of at least one section of each set section decreases in transverse cross section in a given longitudinal direction and a passage of one of the other sections in the same set increases in transverse cross section by a substantially corresponding amount as the decrease effected by the aforementioned section. In some embodiments, each set of discrete sections may include an intake section which includes a tubular body and an intake port coupled to the tubular body. The tubular body may have a peripheral wall which at least partially surrounds a first passage which may have an upper end and a lower end which are mutually longitudinally separated from one another. the first upper end of the first passage may be of a first cross-sectional area while the lower end of the first passage may be of a second cross-sectional area.

Each set of sections may also include a first tapered section which has a second passage with longitudinally spaced upper and lower ends. The second passage may have a cross-sectional area which may be substantially equal to the cross-sectional area of the lower end of the first passage. The first tapered section may be tapered such that the second passage decreases in cross-sectional area such that the cross-sectional area of its lower end is less than that of its upper end. In some embodiments each of the first tapered sections may be nestable at least partially inside one another to increase packing density of the first tapered sections for shipment.

Each set of sections may also include a first tubular section having a third passage with longitudinally spaced upper and lower ends. The third passage may have a substantially uniform cross-sectional area which may be substantially equal to the cross-sectional area of the lower end of the second passage.

Each set of sections may also include a second tubular section which includes a fourth passage having longitudinally spaced upper and lower ends and having a substantially uniform fifth cross-sectional area. The fourth passage may be of sufficient size to permit at least a terminal portion of the first tubular section to be telescopingly received within the fourth passage by an adjustable distance in the longitudinal direction. Thus, the overall longitudinal span of the first and second tubular sections can be selected and/or adjusted in the field in the course of installing a chute in a given building as may be desired to accommodate variations in the vertical slab-to-slab spacing between adjacent floors and/or to accommodate relaxed longitudinal dimensional tolerances of any of the sections themselves. The adjustable distance may be adjustable to any distance within a range. In some embodiments, the range may have a maximum of not substantially less than the longitudinal distance between the upper and lower ends of the third passage.

Each set of sections may also include a second tapered section which may include a fifth passage having longitudinally spaced upper and lower ends. The upper end of the fifth passage may be of a cross-sectional area which may be substantially equal to the cross-sectional area of the fourth passage. The second tapered section may be tapered such that the fifth passage increases in cross-sectional area between its upper end and its lower end. The cross-sectional area of the lower end of the fifth passage may be substantially equal to the cross-sectional area of the first passage of the intake section to permit the second tapered section to be coupled to an intake section of an adjoining set of sections. For shipment, substantially the entirety of a first tubular section can be housed inside a second tubular section and substantially the entirety of that second tubular section can in turn be concurrently housed inside the body of the intake section.

A further aspect of the present invention relates to a method of palletizing sections of a conveyor chute apparatus of a type described herein. Upon a first pallet may be mounted a first layer of chute components and a like second layer of chute components may be stacked above the first layer on the same pallet. In some embodiments, the first layer and the second layer may each include four intake sections, four second tubular sections and four first tubular sections. Each respective one of the intake sections of each layer may have disposed within its tubular body, substantially the entirety of a respective one of the second tubular sections and each of those second tubular sections may have disposed within it, substantially the entirety of a respective one of the first tubular sections. In some embodiments, the tubular body of each of intake section may have a central longitudinal axis oriented substantially perpendicular to a top surface of the first pallet.

A method of palletizing sections of a conveyor chute apparatus of a type described herein may further comprise a substep of interposing a respective one of the first tapered sections longitudinally between the first pallet and each respective one of the four intake sections of the first layer such that the first layer may further include four of the first tapered sections.

A method of palletizing sections of a conveyor chute apparatus of a type described herein may further comprise a substep of interposing a respective one of the first tapered sections longitudinally between the first layer and each respective one of said four intake sections of the second layer such that the second layer may further include four of the first tapered sections.

Upon a second pallet may be mounted at least four stacks of the second tapered sections, each stack having a plurality of second tapered sections which are at least partially nested inside other ones of the second tapered sections. In some embodiments, each stack may have a longitudinal axis which is oriented substantially perpendicular to a top surface of the second pallet.

The palletizing methods hereof significantly increase packing density and thereby significantly reducing shipping costs.

The foregoing and other objects and advantages of the invention will become apparent in view of the following detailed description and the appended drawings in which like reference numerals are used to designate like items.

DETAILED DESCRIPTION OF PREFERRED EMBODIMENTS

Figure 1:
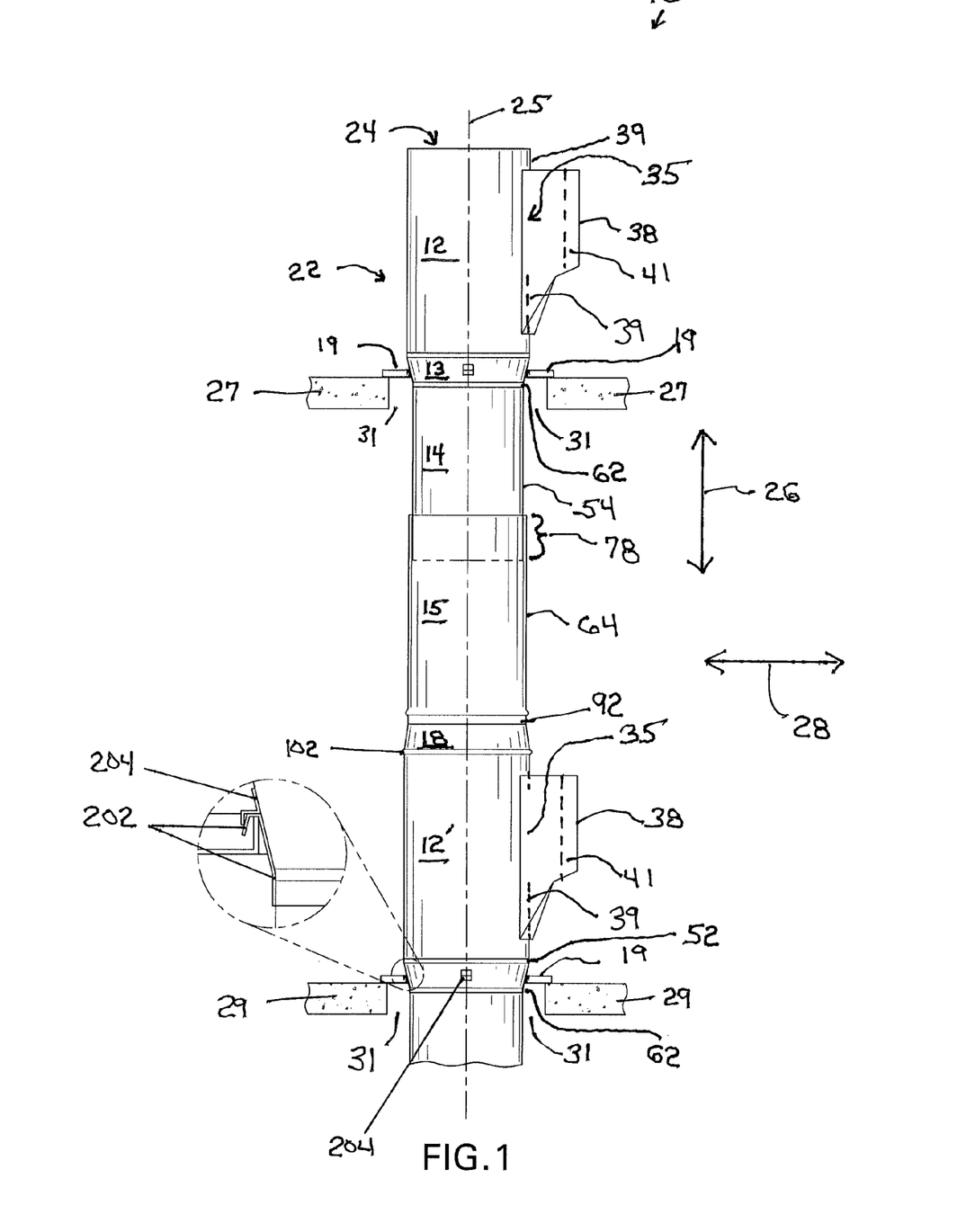
FIG. 1 is a side elevational view showing a typical length of an example conveyor chute as installed between two floors of a building.
Figures 2, 3, 4:
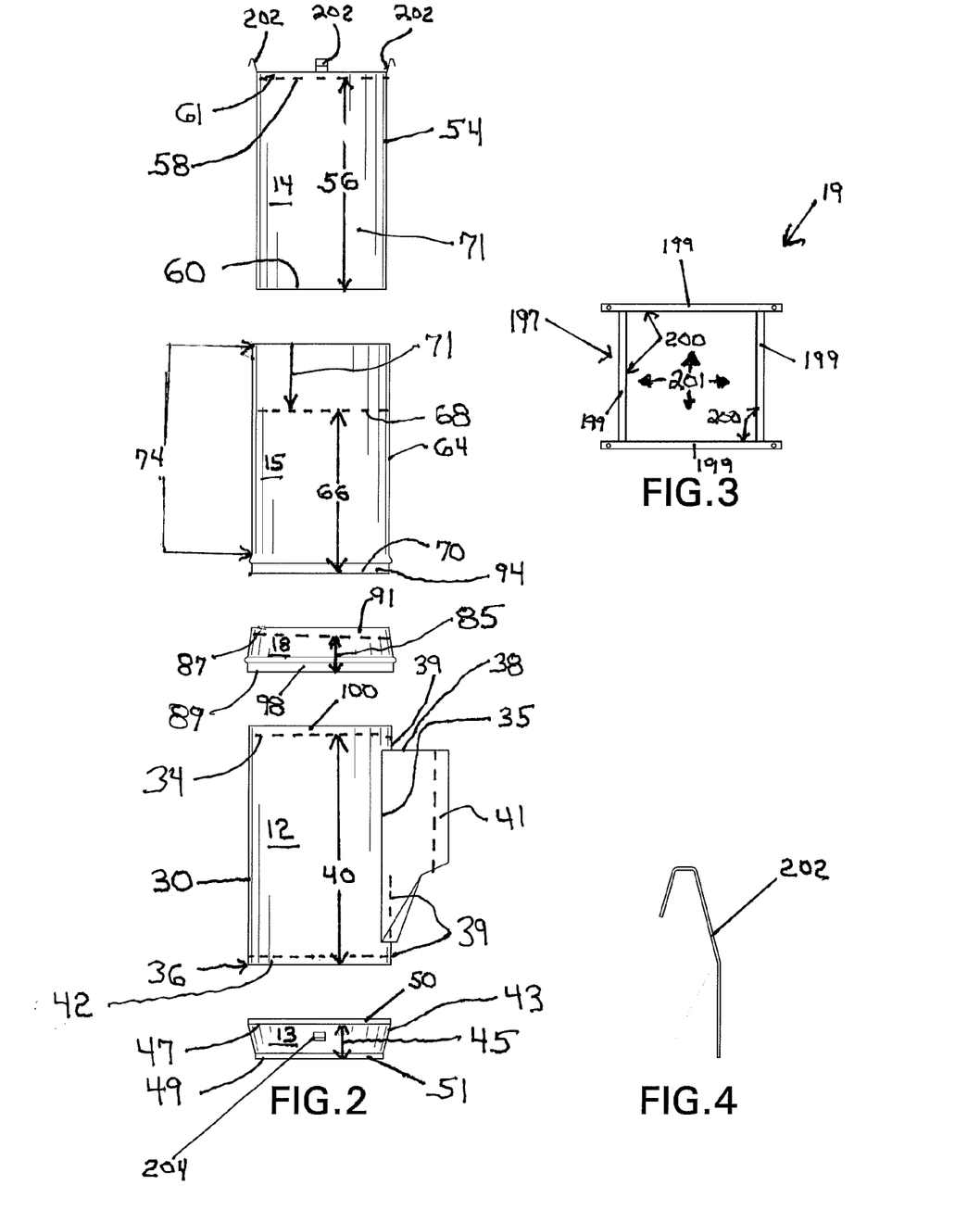
FIG. 2 is an exploded view of a typical length of an example of a conveyor chute showing examples of various sections thereof.
FIG. 3 is a top plan view of an example frame which may be used for mounting a conveyor chute.
FIG. 4 is a side elevational view of an example of a hanger clip which may be used for suspending a first tubular section of a conveyor chute from a frame.

Referring initially to FIGS. 1 and 2, a preferred embodiment of a conveyor chute apparatus 10 according to the present invention may comprise at least one or more sets 11 of discrete hollow sections 12, 13, 14, 15 and 18 which may be coupled to one another to form an elongated hollow conduit 22 having an open bore 24. Each set 11 may include an intake section 12, a first tapered section 13, a first tubular section 14, a second tubular section 16 and a second tapered section 18. Sections 12, 13, 14, 15 and 18 may be formed of sheet metal or any other suitable material, and may be joinable to one another to form an elongated, hollow tubular conduit 22 having a central bore 24. Conduit 22 may have a central longitudinal axis 25 which, upon installation of chute 10 within the interior of a building, may be oriented substantially vertically so that in use of conveyor chute 10, objects, such as trash, recyclables, laundry items or the like, may fall through the open bore 24 under gravity from at least one higher floor 27 of a building to at least one lower floor 29 of the building. Conveyor chute apparatus 10 may also include at least one mount 19 for supporting at least one of the sections 12, 13, 14, 16 and 18 of each set 11 within an opening 31 through which the conduit 22 may pass through one or more of floors of the building, such as the floors 27 and 29 shown in FIG. 1.

In some embodiments, tapered sections 13 and/or 14 each may be of a generally frustoconical shape. In the embodiments shown in the drawings, sections 12, 13, 14, 15 and 16 are shown as each being of substantially circular cross-section in planes transverse to longitudinal axis 25 but it will be appreciated that the invention can be implemented using sections 12, 13, 14, 15 and 18 in which such cross-section may be of some other shape, or shapes, such as for example, ovals and/or or polygons.

As shown in FIG. 2, each intake section 12 may have a tubular body 30 and an intake port 38 coupled to the tubular body 30. The tubular body 30 may have a peripheral wall 39 which may at least partially surround a first passage 40 which extends along longitudinal axis 25 and forms a portion of bore 24 when conveyor chute 10 is in use. First passage 40 may have an upper end 34 and a lower end 36 which are mutually separated from one another in a longitudinal direction 26, that is, a direction parallel to longitudinal axis 25. The upper end 34 of the first passage 40 may be of first cross-sectional area in a plane transverse to the longitudinal axis 25, and the lower end 36 of the first passage 40 may be of a second cross-sectional area in a plane substantially parallel to the plane just mentioned. The aforementioned first and second cross-sectional areas may be substantially equal to one another in some embodiments. The intake port 38 may communicate with the first passage 40 by way of an opening 35 in the wall 34 of tubular body 30. Some or all of the intake port 38 may protrude exteriorly of the peripheral wall 34 of tubular body 30 in a radial direction, that is, in a direction substantially transverse to longitudinal axis 25. In some embodiments, intake port 38 may be provided with a door 41. In some embodiments, a lower portion the tubular body 30 of each intake section 12 may serve as a first male connector 42.

Each first tapered section 13 may include a peripheral wall 43 which may at least partially surround a second passage 45. Second passage 45 may extend along longitudinal axis 25 and form a portion of bore 24 when conveyor chute 10 is in use. Second passage 45 may have an upper end 47 and a lower end 49 which are mutually separated from one another in a longitudinal direction 26. The lower end 49 of second passage 45 may have a transverse cross-sectional area which is less than the cross-sectional area of its upper end 47. Second passage 45 may be tapered so as to decrease progressively in transverse cross-sectional area in a longitudinal direction 26 oriented from its upper end 47 and toward its lower end 49. In some embodiments, such as those illustrated in the drawings, the second passage 45 may taper substantially continuously and linearly but in some other embodiments, second passage 45 may taper substantially continuously and nonlinearly. In yet some other embodiments, the second passage 45 may taper in a discontinuous manner, either stepwise or otherwise. In a plane transverse to the longitudinal axis 25, the upper end 47 of the second passage 45 may be of transverse cross-sectional area substantially equal to the transverse cross-sectional area of the lower end 36 of first passage 40. Due to their tapered shape, a plurality of first tapered sections 13 may be stacked with one nesting at least partially inside one another to form a nested stack for shipping to increase packing density and thereby lower shipping costs.

Intake section 12 and first tapered section 13 may be coupled to one another such that the first passage 40 communicates with the second passage 45. In some embodiments, intake section 12 and first tapered section 13 may be coupled to one another in such a way that the first passage 40 and second passage 45 may substantially immediately adjoin one another. First passage 40 and second passage 45 may be substantially centered with one another on longitudinal axis 25. By way of non-limiting example, an upper end of each first tapered section 13 may terminate in a first female connector 50 of a size and shape which may be matingly complementary to those of the first male connector 42 of input section 12. First male connector 42 may be received snugly within the first female connector 50 so as to couple intake section 12 and first tapered section 13 to one another by way of a first internally liquid shedding lap joint 52. As used herein, the term internally liquid shedding lap joint refers to an at least partially overlapping joint which, though not necessarily liquid tight if under pressure, is operable to shed, or let pass, any liquid which may flow downward along an interior wall of chute 10 without allowing such liquid to leak through the joint to the exterior of chute 10 when the longitudinal axis 25 of the chute 10 is in a substantially vertical orientation. In some preferred embodiments, the first female connector 50 overlaps the exterior of the first male connector 42 by a longitudinal distance of at least about two inches (2 in.).

Each first tubular section 14 may include a peripheral wall 54 which may at least partially surround a third passage 56. Third passage 56 may extend in a longitudinal direction 26 and form a portion of bore 24 when conveyor chute 10 is in use. Third passage 56 may have an upper end 58 and a lower end 60 which are mutually separated from one another in a longitudinal direction 26. In a plane transverse to the longitudinal axis 25, the upper end 58 of the third passage 56 may be of cross-sectional area substantially equal to the transverse cross-sectional area of the lower end 49 of the second passage 45. In some embodiments, third passage 45 may be of a substantially uniform transverse cross-sectional area throughout the longitudinal region between its upper end 58 and its lower end 60. In a plane transverse to the longitudinal axis 25, the upper end 58 of the third passage 56 may be of cross-sectional area substantially equal to the transverse cross-sectional area of the lower end 49 of the second passage 49.

A first tapered section 13 may be coupled to first tubular section 14 in such that the third passage 56 communicates with the first passage 12 by way of the second passage 45. In some embodiments, first tapered section 13 and first tubular section 14 may be coupled to one another in such a way that the second passage 45 of the first tapered section 13 and the third passage 56 of the first tubular section 14 may substantially immediately adjoin one another and may be substantially centered with one another on longitudinal axis 25. By way of non-limiting example, an upper end of each first tubular section 14 may terminate in, or serve as, a second female connector 61 of a size and shape which may be matingly complementary to those of second male connector 51 of first tapered section 13. Second male connector 51 may be received snugly within the second female connector 61 so as to couple the first tapered section 13 and the first tubular section 14 to one another by way of a second internally liquid shedding lap joint 62. In some preferred embodiments, the second female connector 61 may overlap the exterior of the second male connector 51 by a longitudinal distance of at least about two inches (2 in.).

Each second tubular section 15 may include a peripheral wall 64 which may at least partially surround a fourth passage 66. Fourth passage 66 extends in a longitudinal direction 26 and forms a portion of bore 24 when conveyor chute 10 is in use. Fourth passage 66 may have an upper end 68 and a lower end 70 which are mutually separated from one another in a longitudinal direction 26 by a distance which may vary. In a plane transverse to the longitudinal axis 25, the upper end 68 of the fourth passage 66 may be of a cross-sectional area which may be only slightly less than, and is preferably not substantially less than, the transverse cross-sectional area of the lower end 60 of the third passage 56. In some embodiments, third passage 45 may be of a substantially uniform transverse cross-sectional area in the longitudinal region between its upper end 68 and its lower end 70. Second tubular section 15 may be shaped and dimensioned relative to first tubular section 14 such that substantially the entirety of a first tubular section 15 can be housed interiorly of peripheral wall 64 for shipment. Second tubular section 15 may also be shaped and dimensioned relative to intake section 12 such that substantially the entirety of a second tubular section 15 can be housed interiorly of the tubular body 30 of a respective intake section 12 for shipment. Accordingly, for shipment, substantially the entireties of both a second tubular section 14, and a first tubular section 14, may be housed concurrently within the tubular body of a single respective intake section 12.

A first tubular section 14 and a second tubular section 15 may be coupled to one another such that in use, the fourth passage 66 communicates with the first passage 40 by way of the third passage 56 and the second passage 45. Preferably, sections 14 and 15 may be coupled to one another such a way that the third passage 56 of the first tubular section 14 and the fourth passage 66 of the second tubular section 16 may be substantially immediately longitudinally adjacent one another and may be substantially centered with one another on longitudinal axis 25. Substantially the entirety of, or at least a terminal portion 71 of, the first tubular section 14 may be telescopingly received into the fourth passage 66 of the second tubular section 15 by a distance 72 which can be selected and/or adjusted in the field in the course of installing chute 10 in a given building as may be desired to accommodate variations in the vertical slab-to-slab spacing between adjacent floors 27, 29 and/or to accommodate relaxed longitudinal dimensional tolerances of any of sections 12, 13, 14, 15 or 18, or to otherwise suit the needs of a particular installation. Distance 72 can be selected and/or adjusted in the field to substantially any distance within a range 74. In some embodiments, range 74 may have a maximum 76 which is not substantially less than the longitudinal distance by which the upper end 58 of the third passage 56 and the lower end 60 of the third passage 56 are mutually separated from one another. Provided that distance 72 is sufficient, and is preferably not less than about two inches (2 in.), the longitudinal region where second tubular section 5 overlaps first tubular section 14 may form an internally liquid shedding lap joint 78.

Each second tapered section 18 may include a peripheral wall 83 which may at least partially surround a fifth passage 85. Fifth passage 85 may extend along longitudinal axis 25 and form a portion of bore 24 when conveyor chute 10 is in use. Fifth passage 85 may have an upper end 87 and a lower end 89 which are mutually separated from one another in a longitudinal direction 26. The lower end 89 of fifth passage 85 may have a transverse cross-sectional area which is greater than the transverse cross-sectional area of its upper end 87. Second passage 45 may be tapered so as to increase progressively in transverse cross-sectional area in a longitudinal direction 26 oriented from its upper end 87 and toward its lower end 89. In some embodiments, such as those illustrated in the drawings, the fifth passage 85 may taper substantially continuously and linearly but in some other embodiments, fifth passage 85 may taper substantially continuously and nonlinearly. In yet some other embodiments, the fifth passage 85 may taper in a discontinuous manner, either stepwise or otherwise. In a plane transverse to the longitudinal axis 25, the upper end 87 of the fifth passage 85 may be of transverse cross-sectional area substantially equal to the transverse cross-sectional area of the lower end 70 of fourth passage 66. Due to their tapered shape, a plurality of second tapered sections 18 may be stacked with one nesting at least partially inside one another to form a nested stack for shipping to increase packing density and thereby lower shipping costs. In some embodiments the increase in cross-sectional area of the fifth passage 85 of the second tapered section 18 may be substantially equal to the decrease on cross sectional area of the second passage of the first tapered section 13.

Second tapered section 18 and second tubular section 15 may be coupled to one another so that the fifth passage 85 of the second tapered section 18 communicates with the first passage 40 of the intake section 12, by way of the fourth passage 66 of the second tubular section 15, and by way of the third passage 56 of the first tubular section 14 and by way of the second passage 45 of the first tapered section. In some embodiments, second tapered section 18 and second tubular section 18 may be coupled to one another in such a way that the fourth passage 66 and the fifth passage 85 may communicate with one another. Fourth passage 66 and the fifth passage 85 may substantially immediately adjoin one another and may be substantially centered with one another on longitudinal axis 25. By way of non-limiting example, an upper end of each second tapered section 18 may terminate in a female connector 91 of a size and shape complementary to those of mating male connector 94 which may be present adjacent the lower end 70 of the fourth passage 66 of second tubular section 15. Male connector 94 may be received snugly within the female connector 91 so as to couple second tubular section 15 and second tapered section 18 to one another by way of an internally liquid shedding lap joint 92. In some preferred embodiments, the female connector 91 overlaps the exterior of the male connector 94 by a longitudinal distance of at least about two inches (2 in.).

Second tapered section 18 and an intake section 12' of an adjacent set 11 of sections may be coupled to one another so that the fifth passage 85 of the second tapered section 18 communicates with the first passage 40 of the intake section 12'. In some embodiments, second tapered section 18 and intake section 12' may be coupled to one another in such a way that the fifth passage 85 of the second tapered section 18 and the first passage the intake section 12' may substantially immediately adjoin one another and may be substantially centered with one another on longitudinal axis 25. By way of non-limiting example, a lower end each second tapered section 18 may terminate in a male connector 98 of a size and shape complementary to those of a mating female connector 100 which may be present adjacent the upper end 43 of the first passage 40 of each intake section 12,12'. In some embodiments, male connector 98 may be received snugly within the female connector 100 so as to couple second tapered section 18 and intake section 12' to one another by way of an internally liquid shedding lap joint 102. In some preferred embodiments, the female connector may 100 overlap the exterior of the male connector 98 by a longitudinal distance of at least about two inches (2 in.).

As shown in FIG. 1, during installation of chute apparatus 10, a suitably sized opening 31 in each floor 27, 29 may be fitted with a respective mount 19 which, in some embodiments may take the form of a frame 197. By way of non-limiting example, frame 197 may suitably be formed of four members, such as pieces of 1½"×1½"×³⁄₁₆" thick steel right angle stock, which may be welded, or otherwise joined, to form an open parallelogram 201, such as for example a square as illustrated in FIG. 3. Each frame 197 may have horizontal edges 199 which may be bolted, or otherwise supportably mounted, to each respective floor 27, 29. In some embodiments, acoustic isolation pads (not shown) may be operably interposed between mount 19 and the supporting floor 27, 29. Each frame 197 may have vertical edges 200 which may form an inside periphery of the open parallelogram 201.

During installation of chute apparatus 10, each frame 197 may be placed with at least a portion the opening of parallelogram 201 overlying an opening 31 which passes through a floor 27, 29 of the building. Preferably the opening of parallelogram 201 is at least generally centered with respect to the desired longitudinal axis 25 of chute 10. A first tubular section 14 may be suspended from the frame 197. In some embodiments, this may be achieved by way of at least two hangers 202, and in some preferred embodiments at least four hangers 202. In some embodiments, hangers 202 may suitably take the form of straps shaped generally in the form of an inverted letter "J" as illustrated in FIG. 4.

Figure 5:
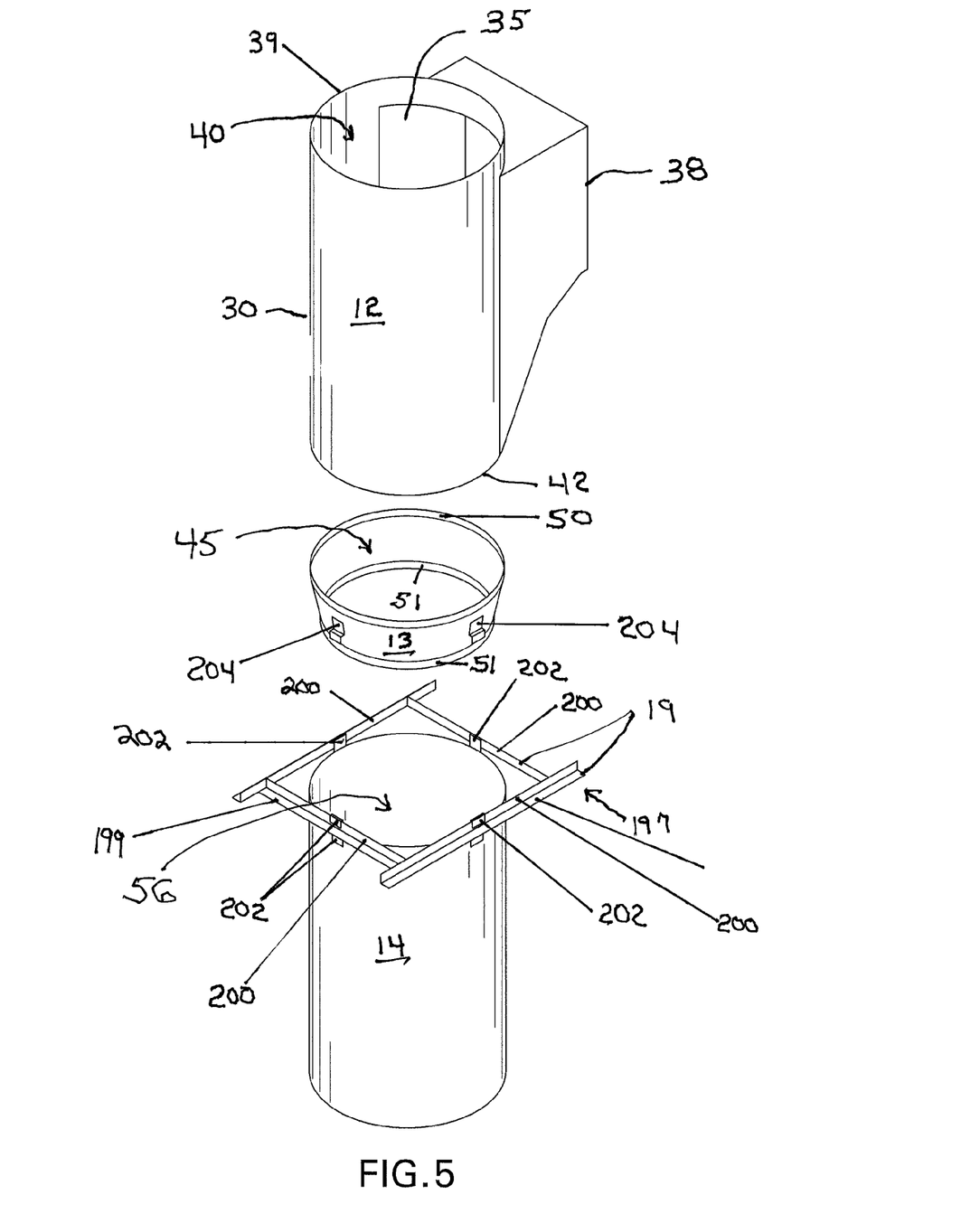
FIG. 5 is an exploded perspective view illustrating an example of a mounting an intake section, a first tapered section and a first tubular section for support by a frame mounted to a floor of the building.

In some embodiments, four (4 ea.) hangers 202 may be welded or otherwise secured adjacent the open top end of each first tubular section 14, preferably at four (4 ea.) substantially equally angularly spaced locations. During installation, the first tubular section 14 may be passed through the frame 197 and opening 31 until the hangers 202 engage the vertical edges 200 of the frame 197 as shown in FIG. 5 so that the first tubular section 14 may be supported by a floor 27, 29 of the building by being suspended from the frame 197. In some embodiments, at least a major longitudinal lengthwise portion of the first tubular section 14 may project from the bottom of opening 31 into the story below as illustrated in FIG. 1.

In some embodiments, each first tapered section 13 may be provided with two or more clips 204. As FIG. 5 shows, an exemplary embodiment may have four substantially clips 204 of a generally stair step shape which may be welded, or otherwise secured, to each first tapered section 13 at generally equally angularly spaced intervals, preferably at angular positions corresponding to those of hangers 202. As can be understood from FIG. 5, when first tapered section 13 is coupled to an adjoining first tubular section 14, a portion of at least one clip 204, and preferably each clip 204, may at least partially overlap, and bear downwardly on, a corresponding one of the hangers 202 from which the adjacent first tubular section 14 may be suspended such that at least one of the hangers 202, and preferably each hanger 202, may be captured forcibly between the frame 197 and a respective one of the clips 204. Such arrangement provides a more secure mechanical connection among first tapered section 13, first tubular section 14 and frame 197.

A further aspect of the invention relates to a method of palletizing sections of a conveyor chute apparatus 10.

Figure 6:
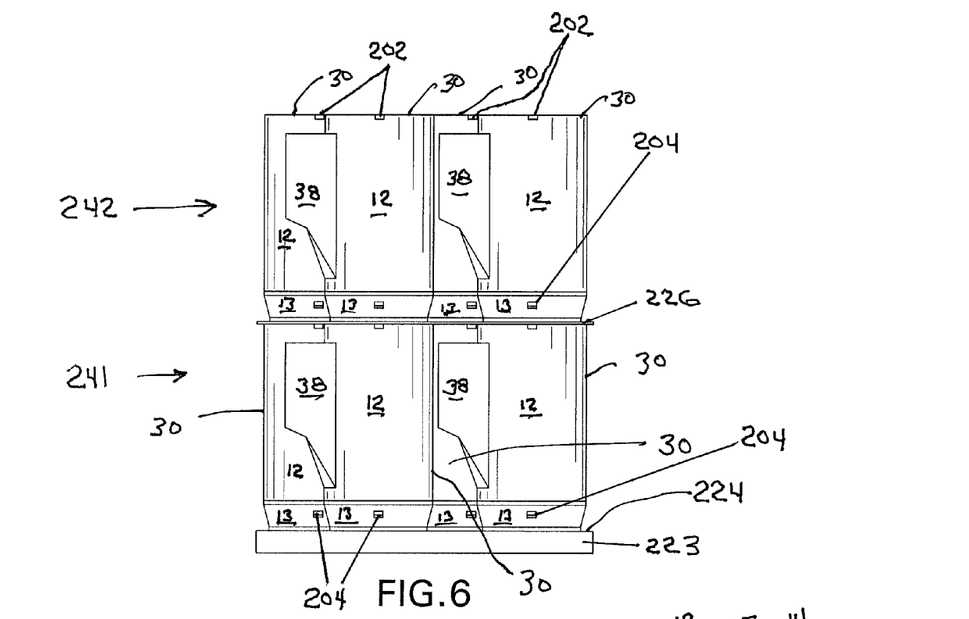
FIG. 6 is a front elevational view of an example of a first palletized load of conveyor chute sections shown mounted on a first pallet.
Figure 7:
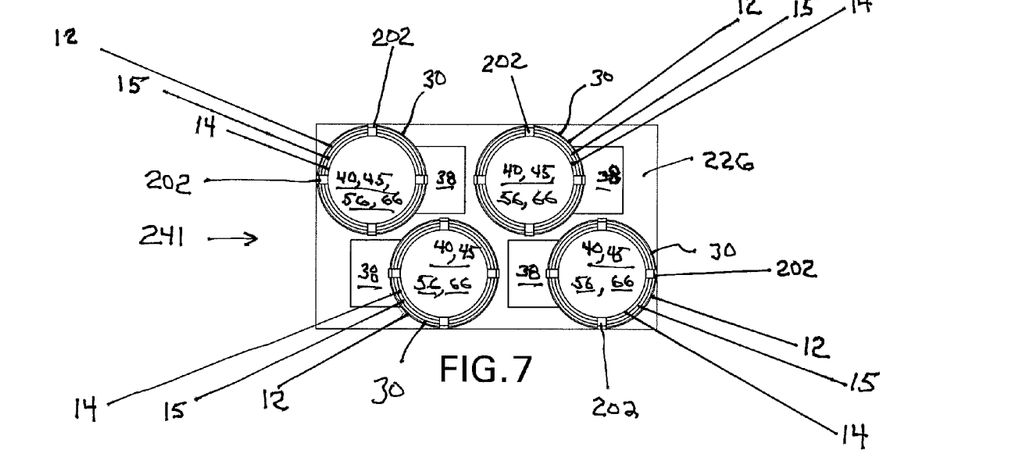
FIG. 7 is a top plan view of the palletized load example of FIG. 6.

In a first step 237 as illustrated in FIGS. 6 and 7, a first layer 241 which may include four (4 ea.) intake sections 12, and four (4 ea.) second tubular sections 15 and four (4 ea.) first tubular sections 14 may be mounted on a first pallet 223. As illustrated in FIGS. 6 and 7 substantially the entirety of a respective one of the four (4 ea.) second tubular sections 15 of the first layer 241 may be disposed within the interior of the tubular body 30 of each respective one of the four (4 ea.) intake sections 12 of the first layer 241 and in addition, substantially the entirety of a respective one of the four (4 ea.) first tubular 14 sections of the first layer 241 may be disposed within the interior of a respective one of the four (4 ea.) second tubular sections 15 of the first layer 241.

In a second step 247 as illustrated in FIGS. 6 and 7, a second layer 242 which may include four (4 ea.) intake sections 12, and four (4 ea.) second tubular sections 15 and four (4 ea.) first tubular sections 14 may be mounted on first pallet 223 stacked above the first layer 241. As illustrated in FIGS. 6 and 7 substantially the entirety of a respective one of the four (4 ea.) second tubular sections 15 of the second layer 242 may be disposed within the interior of the tubular body 30 of each respective one of the four (4 ea.) intake sections 12 of the second layer 242 and in addition, substantially the entirety of a respective one of the four (4 ea.) first tubular 14 sections of the second layer 242 may be disposed within the interior of a respective one of the four (4 ea.) second tubular sections 15 of the second layer 242.

In some embodiments of a method of palletizing a conveyor chute 10 each tubular body 30 of each of the intake sections 12 of the first layer 241 and of the second layer 242 has a central longitudinal axis which is oriented substantially perpendicular to a top surface of the first pallet. In some embodiments, a layer of suitably rigid sheet material 226, such as a sheet of plywood for example, may be disposed longitudinally between the first layer 241 and the second layer 242 in order to provide a uniform and stable mounting surface for the second layer 242 of intake sections 12.

In some embodiments, the first step 231 may additionally comprise a substep 241 of interposing a first tapered section 13 longitudinally between the first pallet 223 and each respective one of the four (4 ea.) intake sections 12 of the first layer 241 such that the first layer 241 may further comprise four (4 ea.) first tapered sections 13.

In some embodiments, the second step 247 may additionally comprise a substep 251 of interposing a respective first tapered section 13 longitudinally between the first layer 241 and each respective one of the four (4 ea.) intake sections 12 of the second layer 242 such that the second layer 242 may further comprise four (4 ea.) first tapered sections 13.

Figure 8:
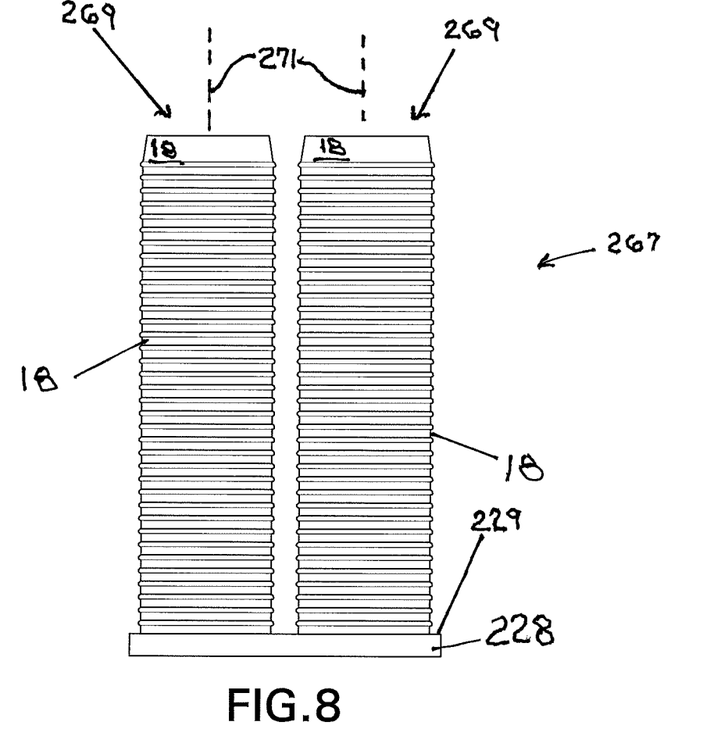
FIG. 8 is a front elevational view of an example of a palletized load of conveyor chute sections shown mounted on a pallet.
Figure 9:
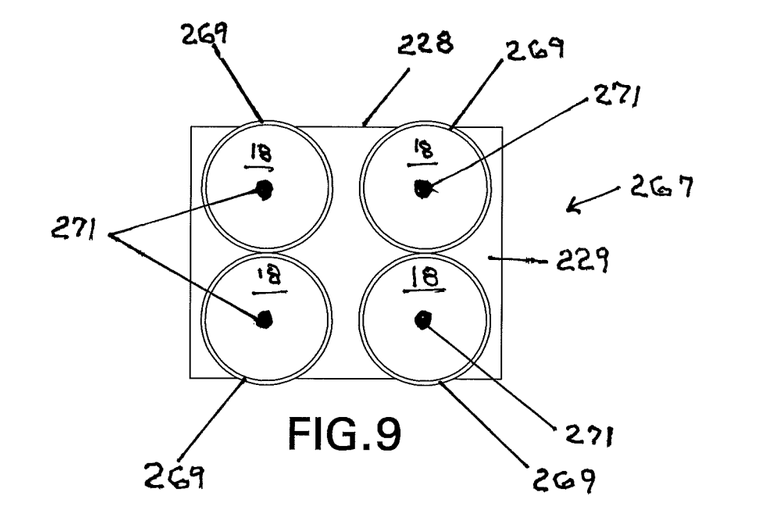
FIG. 9 is a top plan view of the palletized load of FIG. 8.

In some embodiments, a method of palletizing a conveyor chute 10 may comprise, in addition to first step 237 and second step 247 and a third step 267. As illustrated in FIGS. 8 and 9, third step 267 may comprise the step of mounting on a second pallet 228 at least four (4 ea.) stacks 269 of second tapered sections 18 with each stack 269 including a plurality of second tapered sections 18 which may be at least partially nested inside one another. In some embodiments, each of the stacks 269 of second tapered sections 18 may have a respective central longitudinal axis 268 which may be oriented substantially perpendicular to a top surface 229 of the second pallet 228.

The methods described with reference to palletized load configurations shown in FIGS. 6 and 7 can also be carried out to according to the first alternative example shown in FIGS. 10 and 11 and/or according to a second alternative example shown in FIGS. 13 and 14. In each case, a first pallet 223 may carry a total of at least eight (8 ea.) intake sections 12, and eight (8 ea.) second tubular sections 15 and eight (8 ea.) first tubular sections 14. In the embodiments illustrated in the Figs. just mentioned, each first pallet 223 may additionally carry a total of at least eight (8 ea.) first tapered sections 13.

Figure 13:
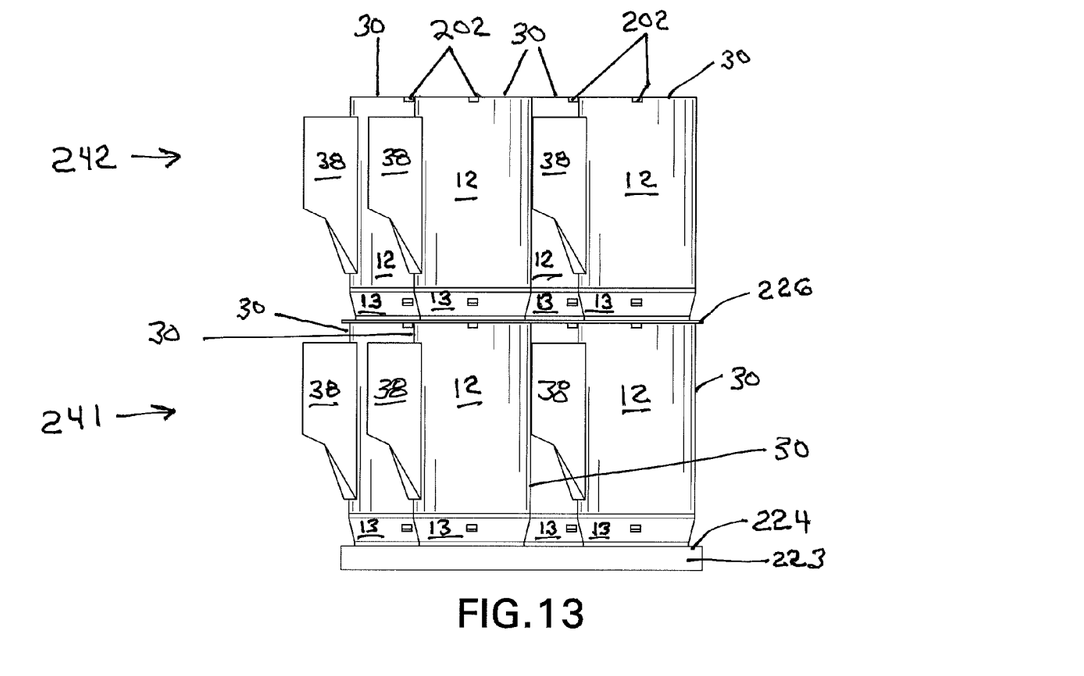
FIG. 13 is a front elevational view of a further alternative example of a palletized load of conveyor chute sections shown mounted on a pallet.
Figure 14:
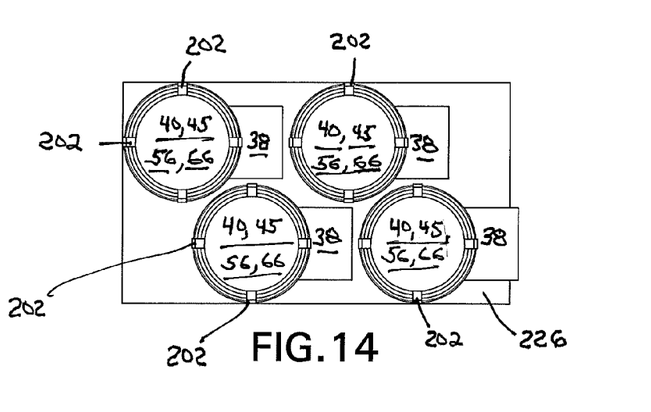
FIG. 14 is a top plan view of the palletized load example of FIG. 13.
Figure 15:
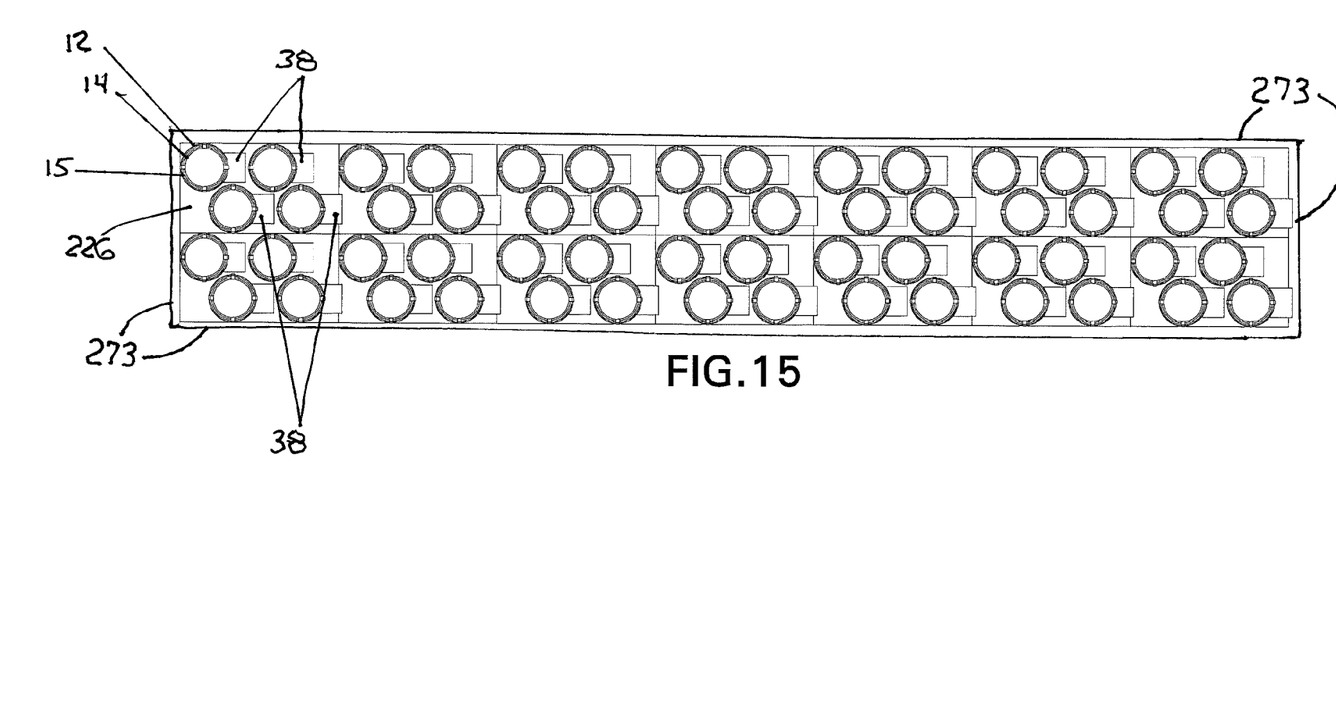
FIG. 15 is a schematic top plan view illustrating the packing of a standard forty foot cargo container with a plurality loads palletized according to the examples illustrated in FIGS. 13 and 14.

As illustrated in FIG. 15, a total of fourteen (14 ea.) double stacked palletized loads palletized according to FIGS. 13 and 14, may be shipped within a standard forty (40 ft.) cargo container 273. Accordingly, it will be appreciated that a standard forty (40 ft.) cargo container 273 can accommodate at least one hundred twelve (112 ea.) intake sections 12, and one hundred twelve (112 ea.) second tubular sections 15, and one hundred twelve (112 ea.) first tubular sections 14, and one hundred twelve (112 ea.) first tapered sections 13.

Figure 10:
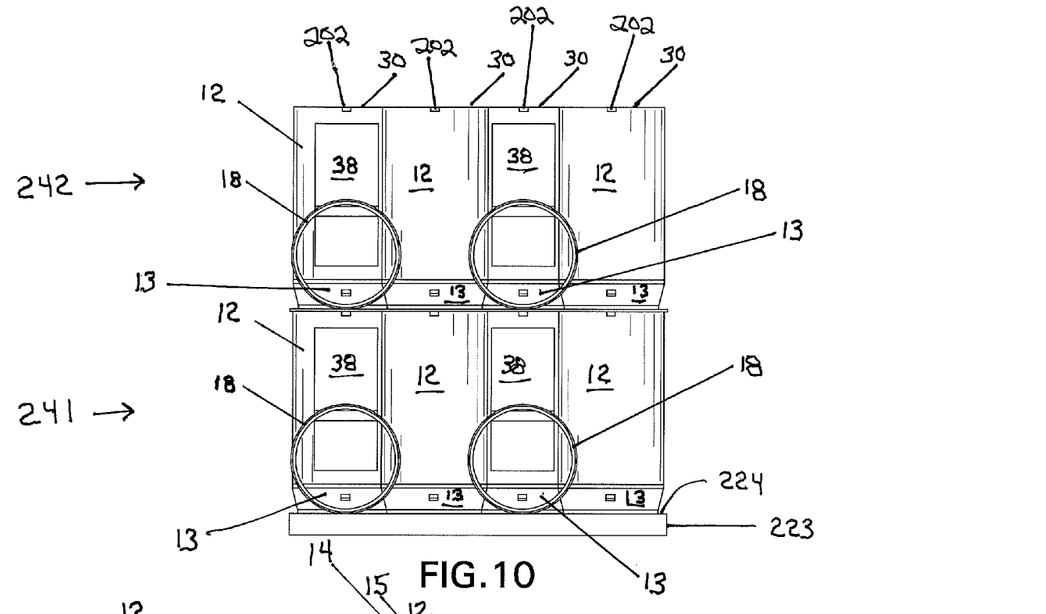
FIG. 10 is a front elevational view of an alternative example of a palletized load of conveyor chute sections shown mounted on a pallet.
Figure 11:
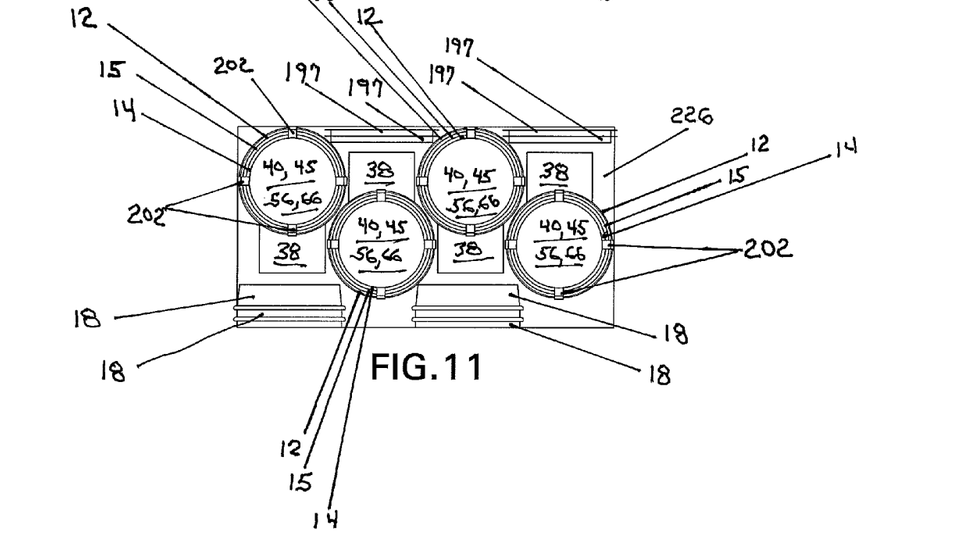
FIG. 11 is a top plan view of the palletized load example of FIG. 10.

As illustrated by FIGS. 10 and 11 a method of palletizing a conveyor chute 10 may comprise, in addition to a first step 237 and a second step 247 as described above, a fourth step 277 and a fifth step 279. Fourth step 277 may comprise the step of mounting on first pallet 223 a total four (4 ea.) pairs of second tapered sections 18 with one of the second tapered sections of each pair being nested at least partially within the other second tapered section 18 of that pair and with two of the pairs of second tapered sections 18 being included in the first layer 241 and with remaining two of the pairs of second tapered sections 18 being included in the second layer 242. The fifth step 279 may comprise the step of mounting on first pallet 223 a total of four (4 ea.) pairs of frames 197 with two of the pairs of frames 197 being included in the first layer 241 and with remaining two of the pairs of the frames 197 tapered sections 18 being included in the second layer 242. In some embodiments, the first step 237, the second step 247, the fourth step 277 and the fifth step 279 may optionally be carried out in combination with third step 267 described above. In some other embodiments, the first step 237, the second step 247, the fourth step 277 and the fifth step 279 may be carried out to the exclusion of third step 267 described above.

Figure 12:
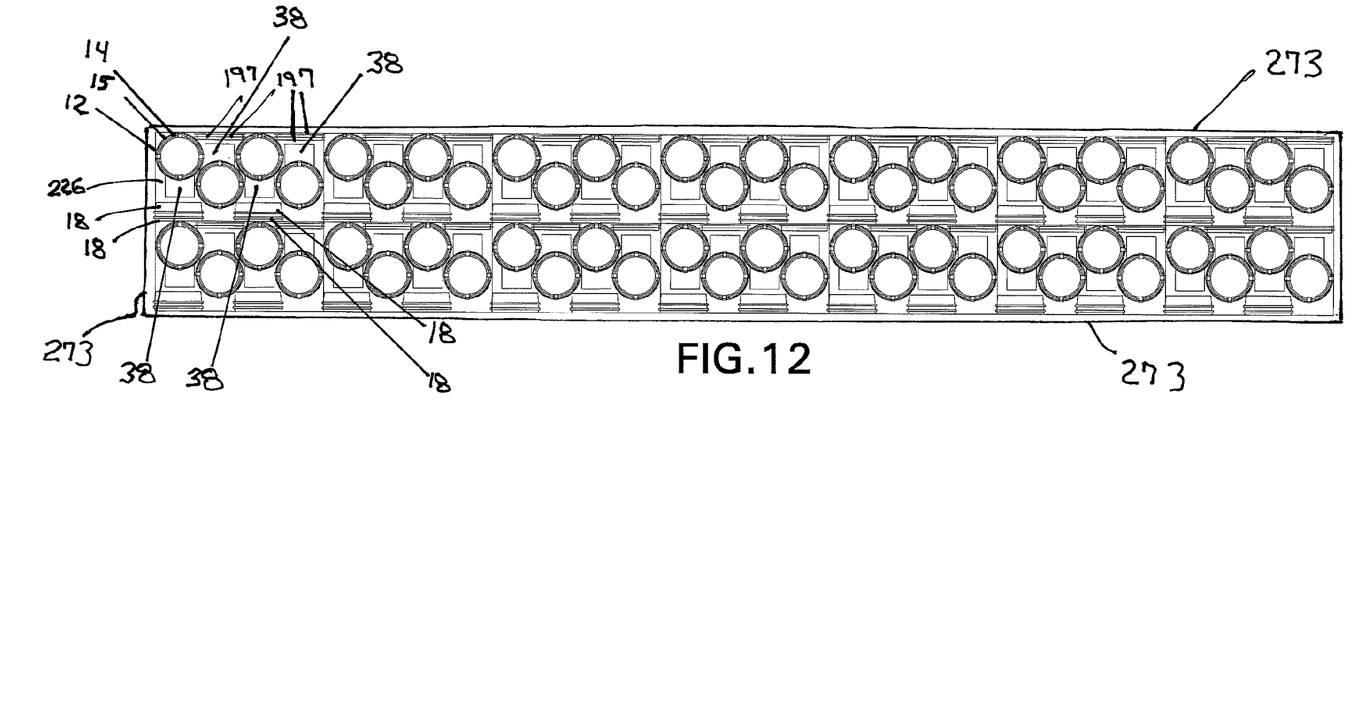
FIG. 12 is a schematic top plan view illustrating the packing of a standard forty foot cargo container with a plurality of loads palletized according to the examples illustrated in FIGS. 10 and 11.

As illustrated in FIG. 12 by carrying out a method of palletizing a conveyor chute 10 which includes first step 237, second step 247, fourth step 277 and a fifth step 279 described above, a total of fourteen (14 ea.) double stacked palletized loads palletized according to FIGS. 10 and 11 may be shipped within a standard forty (40 ft.) cargo container 273. Accordingly, it will be appreciated that a standard forty (40 ft.) cargo container 273 can accommodate at least one hundred twelve (112 ea.) intake sections 12, and one hundred twelve (112 ea.) second tubular sections 15, and one hundred twelve (112 ea.) first tubular sections 14, one hundred twelve (112 ea.) first tapered sections 13, one hundred twelve (112 ea.) frames 197 and one hundred twelve (112 ea.) second tapered sections 18.

While the invention has been described with reference to the preferred embodiments described above, it should be understood by those skilled in the art that various changes may be made and equivalents substituted for elements thereof without departing from the scope of the invention. In addition, many modifications may be made to adapt a particular situation or material to the teachings of the invention without departing from the essential scope thereof. Therefore, it may be intended that the invention not be limited to the particular embodiment disclosed as the best mode contemplated for carrying out this invention, but that the invention will include all embodiments falling within the scope of the appended claims, either literally or under the Doctrine of Equivalents.

What is claimed is:

1. A conveyor chute apparatus for installation inside a building for conveying objects within the building by gravity from at least one higher story of the building to at least one lower story of the building, said apparatus comprising:

(a) at least one set of discrete sections which, in use, are coupled to one another form an elongated hollow conduit mounted entirely inside the building, said conduit passing completely through an opening which completely penetrates a floor of the at least one higher story of the building, said conduit having an open bore through which the objects may pass through at least one floor of the building and fall in a longitudinal direction, under gravity and inside the building, from the at least one higher story to the at least one lower story of the building; and (b) at least one mount for supporting at least one of said sections of each said set in a respective said opening in each said floor of the building through which said conduit passes;

each said set of sections including:
  (i) an intake section which includes a tubular body and an intake port coupled to said tubular body, said tubular body having a peripheral wall which at least partially surrounds a first passage, said first passage forming a first portion of said bore, said intake port communicating with said first portion of said bore by way of an opening formed in said wall of said tubular body, at least a portion of said intake port protruding exteriorly of said tubular body;
  (ii) a first tapered section which, in use, is coupled to said intake section, said first tapered section including a second passage which, in use, communicates with said first passage and forms a second portion of said bore, said first tapered section being tapered such that in said longitudinal direction said second passage decreases progressively in transverse cross-sectional area;
  (iii) a first tubular section which, in use, is coupled to said first tapered section, said first tubular section including a third passage which, in use, communicates with said second passage and forms a third portion of said bore, said third passage;
  (iv) a second tubular section which, in use, is coupled to said first tubular section, said second tubular section including a fourth passage which, in use, communicates with said third passage and forms a fourth portion of said bore, said fourth passage being of sufficient length and transverse cross-sectional area to permit at least a terminal portion of said first tubular section to be received within said fourth passage by an adjustable distance in said longitudinal direction to accommodate variations in distance between adjacent ones of said floors inside the building; and
  (v) a second tapered section which, in use, is coupled to said second tubular section, said second tapered section including a fifth passage which, in use, communicates with said fourth passage and forms a fifth portion of said bore, said fifth passage said second tapered section being tapered such that in said longitudinal direction said fifth passage increases progressively in transverse cross-sectional area;

said fourth passage of said second tubular section being of sufficient length and transverse cross-sectional area to permit substantially the entirety of said first tubular section to be housed within said fourth passage of said second tubular section during shipment; said first passage of said intake section being of sufficient length and transverse cross-sectional area to permit substantially the entirety of said second tubular section to be housed inside said body of said intake section during shipment with said first tubular section being housed concurrently inside said second tubular section.

2. An apparatus as claimed in claim 1 wherein each of said first tapered sections is nestable at least partially inside one another one of said first tapered sections to increase packing density of said first tapered sections for shipment.

3. An apparatus as claimed in claim 1 wherein each of said second tapered sections is nestable at least partially inside one another one of said second tapered sections to increase packing density of said second tapered sections for shipment.

4. An apparatus as claimed in claim 1 wherein each said intake port further includes a door.

5. An apparatus as claimed in claim 1 wherein said mount comprises a frame.

6. An apparatus as claimed in claim 1 wherein said mount comprises a frame and at least two clips, and wherein, in use, said frame is supportably mounted to said floor the building adjacent to the opening in said floor through which said conduit passes and said first tapered section is supportably mounted to said frame by way of said clips.

7. An apparatus as claimed in claim 6 wherein said mount further comprises at least two hangers and wherein, in use, said first tubular section is supported by being suspended from said frame by way of said hangers.

8. An apparatus as claimed in claim 7 wherein, in use, at least one of said hangars is captured forcibly between said frame and at least one of said clips.

9. A method of palletizing a conveyor chute apparatus of the type claimed in claim 1, said method comprising the steps of:
  (a) mounting on a first pallet a first layer of said sections, said first layer including a first four of said intake sections, a first four of said second tubular sections and a first four of said first tubular sections; each respective one of said first four intake sections of said first layer having disposed within said tubular body of said each respective one of said first four intake sections of said first layer, substantially the entirety of a respective one of said first four second tubular sections of said first layer and each respective one of said first four second tubular sections of said first layer having disposed within said fourth passage substantially the entirety of a respective one of said first four first tubular sections of said first layer; and
  (b) mounting a second first layer of said sections on said first pallet, said second layer being stacked above said first layer, said second layer including a second four of said intake sections, a second four of said second tubular sections and a second four of said first tubular sections; each respective one of said first four intake sections of said second layer having disposed within said tubular body of said each respective one of said first four intake sections of said second layer, substantially the entirety of a respective one of said second four second tubular sections of said second layer and each respective one of said second four second tubular sections of said second layer having disposed within said fourth passage substantially the entirety of a respective one of said second four first tubular sections of said second layer.

10. A method as claimed in claim 9 wherein each said tubular body of each of said intake sections has a central longitudinal axis which is oriented substantially perpendicular to a top surface of said first pallet.

11. A method as claimed in claim 9 further comprising a first substep of interposing a respective one of said first tapered sections longitudinally between said first pallet and each respective one of said four intake sections of said first layer such that said first layer further includes four of said first tapered sections.

12. A method as claimed in claim 11 further comprising a second substep of interposing a respective one of said first tapered sections longitudinally between said first layer and each respective one of said four intake sections of said second layer such that said second layer further includes four of said first tapered sections.

13. A method as claimed in claim 9 further comprising the steps of mounting on a second pallet at least four of said stacks of said second tapered sections, each of said four stacks including a plurality of said second tapered sections which are at least partially nested inside other ones of said second tapered sections.

14. A method as claimed in claim 11 wherein each said tubular body of each of said intake sections has a central longitudinal axis which is oriented substantially perpendicular to a top surface of said first pallet.

15. A method as claimed in claim 12 wherein each of said stacks of second tapered sections has a central longitudinal axis which is oriented substantially perpendicular to a top surface of said second pallet.

* * * * *